Feb. 20, 1962 — S. G. MARINOVICH ETAL — 3,021,888
PIPE EXPANDING APPARATUS
Filed Dec. 31, 1956 — 3 Sheets-Sheet 1

ELI J. MARINOVICH
MELAN J. MARINOVICH
SPECIAL ADMINISTRATOR INVENTORS
FOR SAMUEL G. MARINOVICH
DECEASED
BY
ATTORNEY

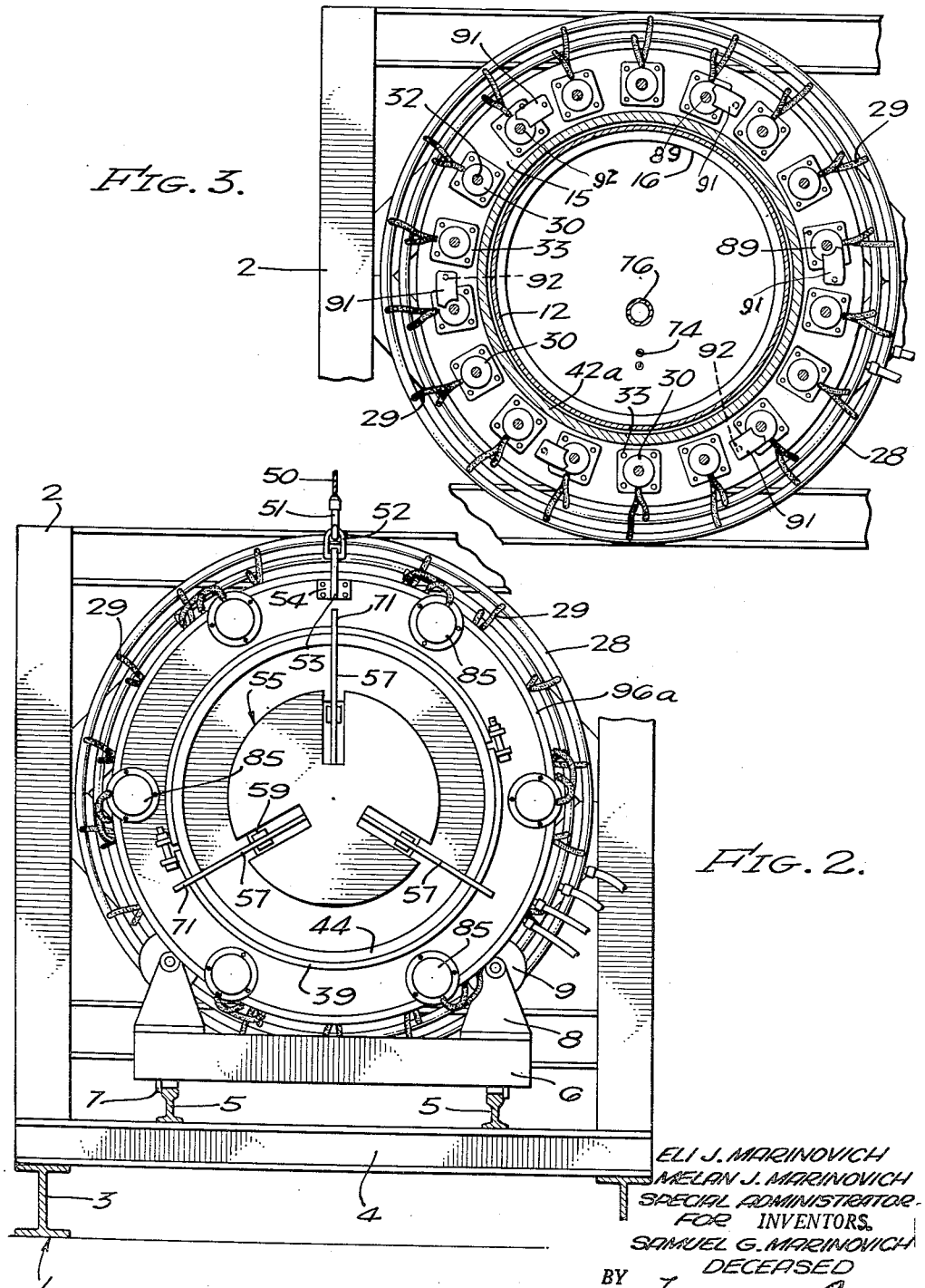

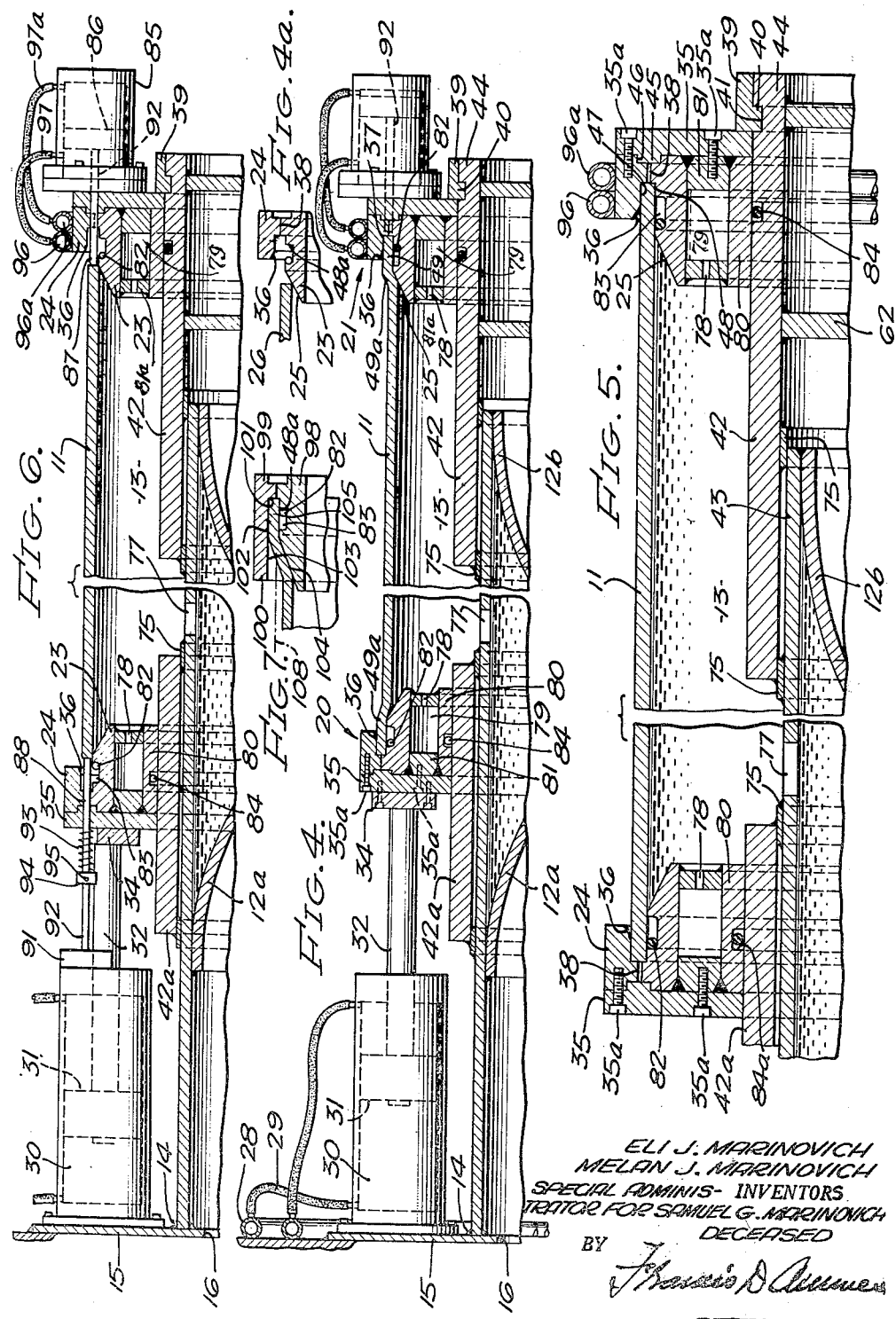

United States Patent Office 3,021,888
Patented Feb. 20, 1962

3,021,888
PIPE EXPANDING APPARATUS
Samuel G. Marinovich, deceased, late of Los Angeles, Calif., by Melan J. Marinovich, special administrator, Los Angeles, and Eli J. Marinovich, Temple City, Calif., assignors, by mesne assignments, to Yuba Consolidated Industries, Inc., San Francisco, Calif.
Filed Dec. 31, 1956, Ser. No. 631,779
17 Claims. (Cl. 153—79)

This invention relates to the manufacture of steel pipe to be used in laying pipe lines, and particularly concerns an improved type of pipe and an apparatus for forming the same.

This apparatus is useful in connection with the treatment of conduits for fluids or liquids particularly fabricated pipe of large diameter.

One of the objects of this invention is to provide an apparatus to facilitate forming a bell on a pipe to receive the spigot end of an adjacent pipe in a joint that is welded as the pipe line is laid.

It is found in practice that in pipe of large diameter even after treatment to form a belled end, the wall is not truly cylindrical. Consequently, in laying such steel pipe, when welding is to be done, it is found that the spigot is not properly centered in the bell. In practice, if a clearance of ⅛ of an inch occurs between the outside diameter of the spigot and the inside diameter of the bell, then when the spigot lies as it must on the inside face at the bottom of the bell, a quarter-inch clearance or crevice will result at the upper face of the spigot. This ¼ of an inch gradually diminishes on each side of the pipe down to zero at the bottom.

One of the objects of this invention is to provide apparatus capable of being used to treat a "blank" pipe, that is, a pipe of substantially uniform diameter throughout its entire length in such a way that it can be expanded into substantially true cylindrical form.

Another object of this invention is to accomplish the formation of incipient bells at the ends of the pipe. The ends of the pipe are distorted to give them a slightly enlarged diameter as compared with the diameter of the pipe body between the incipient bells.

In accordance with this invention, after the incipient bells have been formed, fluid pressure is applied to the inner face of the pipe body between the incipient bells to expand it so that its inner diameter is brought to substantially the same diameter as that of the incipient bells. This eliminates the incipient bells and the resulting pipe is of the desired uniform diameter from end to end.

Another object of the invention is to provide a simple apparatus organized to facilitate the handling of a pipe into a position wherein it is supported and operated upon to form the incipient bells; also to provide for clamping of the pipe material and establishing fluid tight seals, and also to provide for closing and sealing the pipe ends to enable the fluid pressure to be raised sufficiently to effect the desired expansion of the pipe body between the incipient bells.

A further object of this invention is to provide a reservoir contiguous to the supported pipe, and preferably mounted coaxially within the pipe, for maintaining continuously a considerable volume of fluid, preferably liquid, so that an annular space of relatively small volume is housed between the wall of the reservoir and the wall of the pipe. The use of this inner reservoir accomplishes another result. Both sides of the reservoir are subjected to the same high pressure, which in practice may be in the neighborhood of 1100 pounds per square inch.

Another object of the invention is to employ equalizing pressures as regards the inside die-rings of the upsetting assemblies that project into the end openings of each pipe during the upsetting operation.

Other objects of this invention are to produce a procedure and organization of mechanical means for effecting the upsetting of a "blank" pipe length at one, or both, ends and to provide improved means for controlling the operations of the upsetting means, particularly their movements in relation to each other on guiding means that support them.

Another object of the invention is to provide improved means for effecting the ready removal of the completed processed pipe from the apparatus.

A preferred embodiment of the invention is described in the following specification, while the broad scope of the invention is pointed out in the appended claims.

In the drawing:

FIGURE 1 is a longitudinal section in a vertical plane through apparatus embodying this invention. The middle portion of this view is broken away. This view shows a pipe in place in the apparatus after its ends have been distorted into incipient bells and the pipe is ready to be expanded to a larger diameter.

FIGURE 2 is an elevation showing the right end of the apparatus illustrated in FIGURE 1 and showing in section the under-framing for supporting and guiding the pipe into place in the apparatus.

FIGURE 3 is a vertical section on the line 3—3 of FIGURE 1, with portions of the framing broken away, and showing a gang of power cylinders mounted at this end of this machine.

FIGURE 4 is a broken-away view that is a section taken in a radial plane through the longitudinal axis of the machine as shown in FIGURE 1 and showing details of the main upsetting assembly at the left, and the similar auxiliary upsetting assembly at the right.

FIGURE 4a is a fragmentary section in a radial plane showing the relation of the end of the pipe to the die-rings of the upsetting assembly when the pipe is in position to start the upsetting operation.

FIGURE 5 is a view similar to FIGURE 4 but showing the pipe with its ends clamped between the die-rings of the upsetting assemblies after the interior of the pipe has been expanded by internal fluid pressure and the incipient bells have been eliminated.

FIGURE 6 is a view similar to FIGURES 4 and 5, illustrating the ejector mechanism of the upsetting assemblies and the separation of the ends of the pipe from the die-rings as the upsetting assemblies withdraw.

FIGURE 7 is a vertical section through apparatus employed for forming a real bell at one end of the pipe. This view shows parts of the bell and of the contiguous portion of the pipe broken away.

Figure 1:
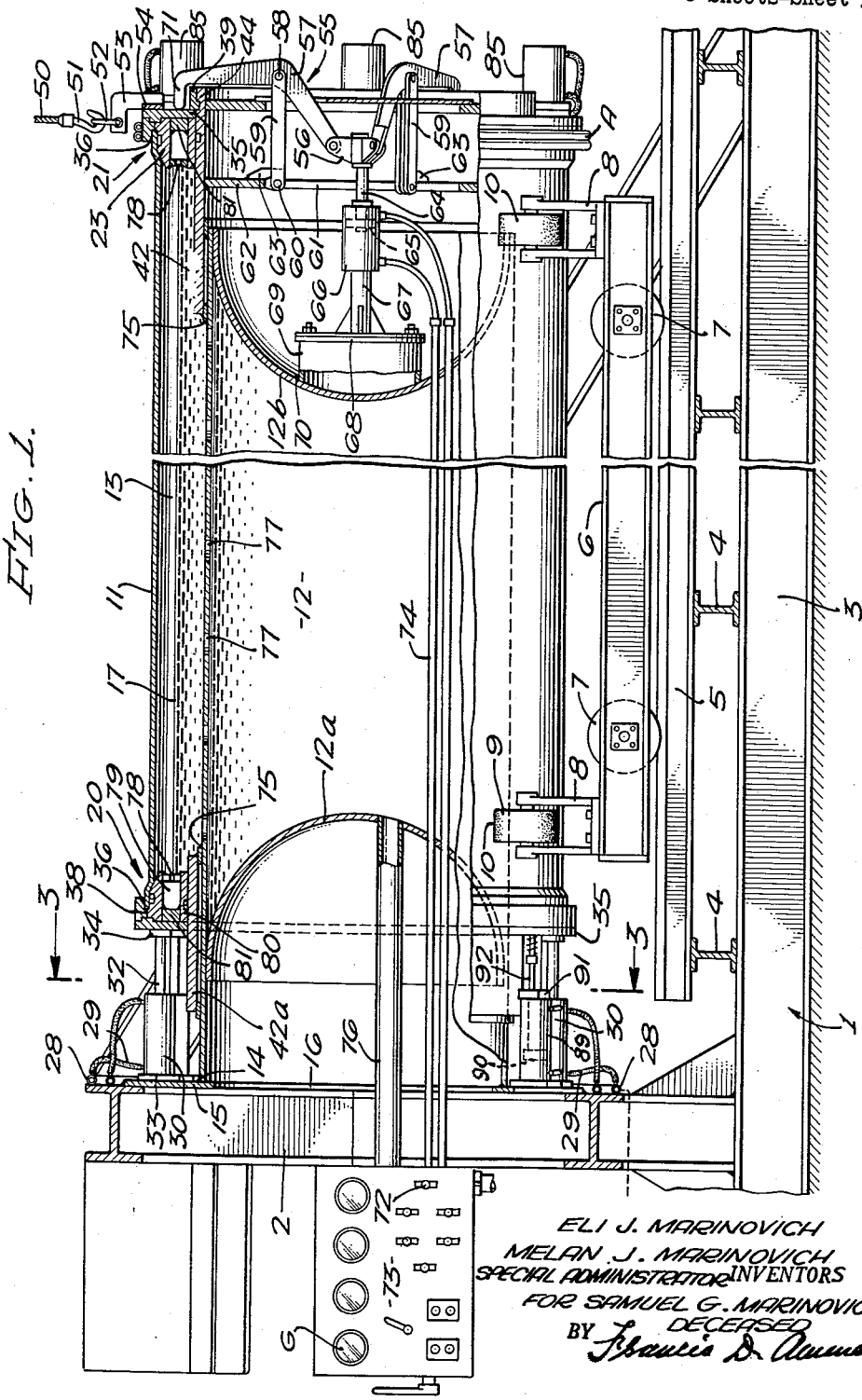

In the apparatus a frame structure 1 is provided including an upright head frame 2 rigidly secured to a horizontal under-frame 3 composed of steel stringers supporting a plurality of cross-beams 4 constituting a track bed for ordinary track rails 5.

On the rails a dolly 6 is mounted by flanged wheels 7. This dolly is provided with four roller brackets 8, two on each side, supporting rollers 9 that have cushion type tires 10. The dolly forms a cradle for supporting a pipe 11 of relatively large diameter.

In practice, the pipe 11 is first lowered by a hoisting apparatus (not illustrated) onto the dolly 6 located to the right of where it is shown in FIGURE 1.

The dolly 6, loaded with the pipe, is then moved to the left into the FIGURE 1 position and to telescope the pipe over a core 12 supported at its left end from the head frame 2. Due to the difference in the diameters of the pipe and of the core, there is an annular space 13 between their walls.

The steel core 12 is preferably of drum form with its inner or left end having a weld 14 to a faceplate 15 of the head frame 2. If desired, to save material, the faceplate 15 has a large opening 16, near the edge of which the weld 14 is made, preferably on both sides of the wall of the core 12.

The core is always full of the operating fluid. Water will serve for this purpose. The core 12 serves as a reservoir communicating at its upper side, at one level only with the space 13. In raising hydraulic pressure against the inner face of the pipe, it is only necessary to increase the volume of liquid sufficiently to occupy the annular space 13. For example, after an expanding operation on the pipe 11, it is required merely to fill the space within the annulus 13 with water before the expanding pressure against the inner face of the pipe wall would begin to rise.

Another advantage of locating the core 12 inside the pipe 11 is that there is no unbalanced pressure on the inner side of the core, so that the core wall can safely be of little thickness.

The ends of the core are closed by drumheads 18 and 19. These are subjected to unbalanced high pressure, for example, approximately 1100 pounds per square inch when expanding steel pipe of about three quarters of an inch wall thickness, and of a material having a tensile strength of fifty five thousand pounds per square inch. For this reason, we employ concavo-convex drum heads 12a and 12b with their convex sides toward the interior of the core.

In order to accomplish the expanding operation two upsetting assemblies 20 and 21 are provided that function first to expand the pipe ends into what we call incipient bells 49a (FIGURE 4) because they are of a transitory, or ephemeral nature, and actually become eliminated by the expanding of the body portion of the pipe between them.

The assemblies 20 and 21 are in the form of annuluses surrounding the end portions of the core 12. The assembly 20 near the head-frame is the main assembly, while the other is the auxiliary assembly. They are substantially alike in construction and function.

Each of the assemblies 20 and 21 includes two die rings (see FIGURES 4, 5 and 6), an inside die ring 23 and an outside die ring 24. The inside die rings have an inclined face 25 against which the end 26 of the pipe rests initially (see FIGURE 4a) when the blank pipe is set in place in the machine as shown in FIGURE 1, ready to have its ends enlarged.

After the pipe is positioned as shown in FIGURE 4a, water under pressure is admitted to a ring form manifold 28 having lead-in hose pipes 29 connecting to the left ends of a plurality of power cylinders 30 (see FIGURE 4). Pistons 31 in the cylinders then move their piston rods 32 forward to the right. The power cylinders 30, as shown in FIGURE 3, are spaced equidistantly from each other in a circle, each cylinder 30 having a flange 33 bolted to the faceplate 15. Each of the piston rods 38 carries a saddle 34 the forward face of which is bolted against the rear face of a base ring 35, the forward side of the base ring being ultimately attached to both the die rings 23 and 24 of the assembly by screws (see FIGURE 5).

While the die rings 24 and 23 are pushed forward by the piston rods 32, the extreme ends 26 of the pipe are bent up as they "cam" on the inclined conical guide faces 25, and as they turn outward they finally engage respectively with conical shoulders 36.

The extreme ends 26 ride up simultaneously on the inclined conical faces 25 at both of the assemblies 20 and 21, and are guided by the shoulders 36 into annular sockets 37 formed between the inside rings 23 and the outside rings 24 which substantially abut on the line 38, as indicated in FIGURE 5. At the right end of the machine, a back-up ring 39 (FIGURE 5) is provided for the base ring 35. The ring 39 is split and on its underside is formed with an inwardly projecting flange 40. Receiving the flange is a circumferential groove 41 in a relatively thick centering sleeve 42 carried on the core 12. The split back-up ring 39 may be expanded slipped over the adjacent end 44 of the sleeve 42 and released to spring the flange 40 into the groove 41.

The inner face of the base ring 35 (FIGURE 5) is provided with a rectangular bead 45 that seats in a corresponding counterbore 46 formed near the line 38 where the inner and outer rings have juxtaposed faces. These faces should not be in contact, in order to insure that sufficient lateral pressure will be exerted between the side faces 47 and 48 of the sockets 37 into which the incipient bell 49 is forced. These faces function later to clamp the material in forming the lips of the incipient bells.

For the auxiliary upsetting assembly 21, we prefer to provide a supporting cable 50 (FIGURE 1) hanging from a hoist (not illustrated) and provided with a hook 51 carrying a clevis 52. This clevis carries an angular bracket 53 on a face plate 54 that is welded or otherwise secured to the outerface of the base ring 35.

This cable 50 is preferably a fall from a hoist which facilitates handling the assembly 21 off the end of the faces 47 and 48 of the sockets 37 into which the incipient core 12 with its inside end supported on the inner die ring 23 of the main upsetting assembly 21 and also enabling the auxiliary upsetting assembly 21 to be readily replaced.

In order to provide means for positioning the inside die ring 23, as shown at the right of FIG. 1, on its adjacent sleeve 42, we employ a spider 55 having a central hub 56. Arms 57 are pivotally attached to the hub and are disposed in radial planes with respect to the axis of the core 12. These arms are actually levers of bell-crank form pivotally held by pins 58 on corresponding links 59. The links are anchored on pivots 60 at the edge of an opening 61 in a transverse bulkhead 62 of annular form within the sleeve 42.

The pivots 60 are mounted in brackets 63 welded to the bulkhead 62. The hub 56 is attached to the end of a piston rod 64, the piston 65 for which is carried in a power cylinder 66. This cylinder 66 is mounted on a post 67 coaxial with the core 12, and supported at its inner end on a transverse plate 68 bolted to a base-fitting 69 secured by a ring weld 70 to the concave face of the adjacent drum head 12b.

The arms of the spider 55 have horizontally projecting tips 71 with rounded ends. By moving the handle 72 of an admission valve (not illustrated), mounted on a control panel 73, operating fluid under pressure is passed through a conduit 74 to the inner end of the power cylinder 66 and forces the piston 65 toward the right as viewed in FIGURE 1.

If desired, the power cylinder 66 may be long enough to permit some over stroke of the piston, in which case the arms of the spider 55 have a sufficient forward movement to give the base ring 35 movement sufficient to ease the pressure against the forward edge of the back-up ring 39. This facilitates the removal of the back-up ring 39 after an upsetting operation has occurred.

The sleeve 42 and the similar sleeve 42a, at the left end of the core, are of band form and function as cylindrical guides for any movements of the upsetting assemblies 20 and 21 parallel with the axis of the core. For this reason, the sleeves are of increased relative thickness as compared with the wall of the core.

In order to insure that the sleeves 42 and 42a will hold the axes of the upsetting assemblies 20 and 21 in line with each other and substantially in line with the axis of the core 12, we prefer to employ a pair of rings 75 associated with each of the sleeves 42 and 42a to perform the function of circular shims. That is to say, the outer faces of the rings 75 may be slightly eccentric with respect to their bores so as to overcome any inaccuracies or deficiencies in alignment of the outer face of the core 12. When the thick bands 42 and 42a are in position on the shim rings 75 the band axes will coincide with the axis of the core 12.

Furthermore, the shim rings 75 facilitate making continuous peripheral welds at their side edges to secure them to the outer face of the core 12.

After the upsetting assemblies 20 and 21 have been caused to approach each other relatively, by the operation of the power cylinders 30, and the upsetting of the ends of the pipe 11 has been completed, the operating fluid under pressure from a pump is then admitted through an admission pipe 76, and through the drum head 12a into the interior of the core 12. From there the fluid passes upwardly through a plurality of openings 77 in the top of the core 12 and flows into the annular space 13. As the water level 17 rises in the annular chamber 13, the water under pressure passes through vent 78 in a ring 81a into a chamber 79 between the inner die-ring 23 and a base ring 80 of the assemblies 20 and 21 and closed by an inner ring wall 81. The ring 80 of each assembly 20 and 21 has a sliding fit on the outer face of the sleeve 42 or 42a.

Liquid under pressure of 1100 p.s.i., or greater if necessary, exerts its force uniformly over the entire area of the inner face of the body portion of the pipe 11 between the incipient bells 49. Under this expanding force the material composing the pipe wall yields sufficiently to give the pipe a slightly larger diameter. As this occurs, the material composing the inclined shoulders 49a'' flows outwardly into a cylindrical neck portion having the same diameter as the incipient bell 49 the entire completed pipe having the new slightly enlarged diameter. This condition is illustrated in FIGURE 5.

The final disposition of the material of the shoulders 49a results in a slight shortening of the pipe. Such shortening of the pipe is compensated for by admitting additional operating liquid into the rear chambers of the cylinders 30, back of the pistons 31.

In machining the adjacent faces of the die rings 23 and 24, the width (measured radially) of the sockets 37 should be slightly scant compared with the thickness of the pipe wall. This causes the sockets to function most effectively in forming the bells 49.

In order to increase the efficiency of the expanding operation it is necessary to provide means for packing the areas of contact between the inner face of the pipe and the inside die rings 23. For this purpose we provide O-rings 82 held captive in relatively wide grooves 83. The rings 82 have a rolling movement against the shoulder 48a caused by contact with the pipe ends when the pipe ends are pushed into the upsetting sockets 37. (See FIGURES 4a and 7.)

We also provide liquid tight packing for the contact area between the base rings 80 and the outer face of sleeves 42 and 42a. For this we also employ O-rings 84 held captive in relatively narrow grooves 84a cut in the outer faces of the sleeves 42 and 42a. These grooves 84a however, need not be over-wide to permit rolling of these O-rings 84.

The packing or O-rings 82 and 84 substantially prevent leakage of the operating liquid. Hence, the annuluses constituted by the upsetting assemblies 20 and 21 afford means for effectively closing the ends of the pipe 11 when placed in the machine, as shown in FIGURE 1, for processing.

In addition to expanding the pipe body to produce a larger, and truer cylindrical pipe, in practicing the invention we may, if desired, subject the pipe to any degree of internal pressure to meet any standard required or any contract specification. This test can be made before removing the pipe from the machine. At all times during the expanding and testing operations measuring tape thrown over the top side of the pipe should be used to measure the increase in diameter under certain pressures, the corresponding pressures being indicated on the gauges G mounted on the panel 73.

After the pipe 11 that is being processed has reached the stage and shape shown in FIGURE 5 it can be removed by operating the valve handle 72 to open the rear end of the cylinders 30 to exhaust, and to admit the operating liquid to the forward side of the piston 31, thereby withdrawing the extended piston rods 32 and the main upsetting assembly 20.

If desired, at the same time two ejecting mechanisms are actuated to exert thrust forces against the ends of the pipe. The ejector mechanism for the auxiliary upsetting mechanism 21 includes a plurality of power cylinders 85 (see FIGURES 2 and 6), carrying pistons 86 with small diameter rods 87 that can advance through small guide openings formed by drilled holes 88 the axes of which are located at the meeting line 38 (see FIGURE 5), of the rings 23 and 24.

The advancing forward ends of the rods 87 push the right end of the pipe 11 out of its clamping socket 37. This occurs as the plurality of power cylinders 30 at the left end of the machine (see FIGURES 1 and 3) operate their pistons 32 to retract the die rings 23 and 24, which are now tight on the expanded pipe end. As this retraction occurs, a plurality of ejection stems 92 abut blocks 91 projecting from the cylinder 30 and slide in their guide holes 88 between the retracting rings 23 and 24 and engage and exert considerable force against the end face of the pipe 11 and this separates the retracting rings from the stopped pipe.

Each stem 92 carries a helical return spring 93 thrusting at its outer end against a collar 94 adjustably mounted with a set-screw 95, the tip of which bites into the side of the stem.

The ejecting cylinders 85 for the auxiliary upsetting assembly 21 are served with operating liquid by a manifold 96 that encircles this assembly. Small flexible high pressure hose connections 97 lead in from the manifold 96 to the one end of each individual cylinder 85, while a similar hose connection 97a connects the other ends of these cylinders to a manifold 96a similar to the manifold 96.

The pipe 11 is most readily handled into, and out of the processing unit shown in FIGURE 1, by providing two spaced apart slings extending down from a carriage running along an overhead I-beam (not shown).

It is possible to upset one end of a pipe to offset the material at the end of the pipe to a considerably greater extent than is done in forming an incipient bell. It is possible to upset the pipe end so that the offsetting of the lip of the bell from the side wall of the pipe is sufficient to produce a real bell; a bell having a lip offset sufficiently to enable a straight cylindrical spigot end of an adjacent pipe length to be received in the bell.

When this considerable offset is made at one end of the pipe the other end of the pipe can simultaneously be upset and offset with an incipient bell.

After the pipe has been treated to have a real bell at one end and an incipient bell at the other end, the body portion of the pipe between the two bells is subjected to hydraulic pressure to expand it unrestrictedly from without, to a larger diameter which will eliminate incipient bell, but will leave the real bell. In using the word "unrestrictedly" we mean to say that the expanding wall of the pipe is not held against free expansion on its outer side, so that its expanded diameter is determined solely by the pressure employed inside the pipe.

In FIGURE 7 we illustrate the features of construction of die rings that enable a real bell to be upset on one end of a pipe while an incipient bell is being upset and formed at the other end of the pipe as indicated at the left portion of FIGURE 4 where the main upsetting assembly 20 is located.

Referring to FIGURE 7, we provide an inner die ring 98 of relatively greater length and thickness than the inside die ring 23 and an outer die ring 99 also of greater length than the outside die ring 24 because of a forebody 100 having an extended face past which the material being upset and offset moves in entering the socket 37.

Referring to FIGURE 7, the inner die ring 98 has a conical guide face 104, and also has an inner cylindrical guide face 103 that has the same diameter as and constitutes an extension of the face 102 of the socket 101 and that cooperates in forming the relatively long lip 105 of the real bell. The conical guide face 104 on the inner die ring 98 may, if desired, be machined with the machining extending back from its forward face. The conical guide face 104 deflects and deforms the edge of the advancing mouth of the pipe to force it up against the face 103. This forms the relatively long lip 105 of the bell.

The cylindrical socket 101 machined into the inner face of the outer die ring 99 determines the outer diameter of the pipe body when it is expanded by the hydraulic pressure in the same manner as the modification illustrated in FIGURES 4 and 5. That is to say, the outer face of the pipe lies along the dotted line 108. In this modification of the procedure the hydraulic pressure should not be so great as to form a shoulder in the pipe wall at the forward face of the fore-body 100.

Many other embodiments of this invention may be resorted to without departing from the spirit of this invention.

We claim as our invention and desire to secure by Letters Patent:

1. In apparatus for producing a pipe of a desired diameter, the combination of a frame structure, a head frame included in said frame structure, a reservoir for operating fluid supported on said head frame and having a diameter approximating but smaller than said desired diameter to enable a pipe to be telescoped over said reservoir, annular clamping and sealing means mounted on said reservoir including an inner tapered ring engaging the end of the pipe on its face, and an outer ring resisting the expanding force of the tapered ring, for closing an end of said pipe clamping and sealing means including an inner tapered ring engaging the end of the pipe on its face and an outer ring resisting the expanding force of the tapered ring, for closing and sealing the other end of said pipe, said reservoir having vents establishing communication from the interior of the reservoir into the space in the pipe surrounding the reservoir, means for actuating the clamping means to hold and seal the ends of the pipe and means for increasing the pressure of the fluid within the pipe to expand the same unrestrictedly from without to approximately said desired diameter.

2. Apparatus for producing a pipe of a desired diameter according to claim 1, in which the reservoir is of cylindrical form and includes concavo-convex heads closing the ends of the reservoir, and with their convex sides disposed toward the interior of the reservoir.

3. Apparatus for producing a pipe of a desired diameter according to claim 1, in which said reservoir is of cylindrical form; and in which the said clamping and sealing rings are guided to slide on the outer wall of the reservoir.

4. Apparatus for producing a pipe of a desired diameter according to claim 1, in which said reservoir is of cylindrical form; and in which the said clamping and sealing means are of annular form, and are guided to slide on the outer wall of the reservoir; and in which the clamping means includes a ring of substantially tapered cross-section to engage the inner face of the material at the end of the pipe to swage the same outwardly, and includes a ring of larger diameter encompassing the inner ring and co-operating with the same to develop a bell-form mouth on the ends of the pipe.

5. Apparatus for producing a pipe of a desired diameter according to claim 1, in which the said reservoir is of cylindrical form; and in which the said clamping and sealing means are of annular form; and are guided to slide on the outer wall of the reservoir; and in which the clamping means includes an inner sealing ring of substantially cuneiform cross-section to engage the inner face of the material at the end of the pipe to swage the same outwardly, and includes a ring of larger diameter encompassing the inner ring and co-operating with the same to resist the expanding force of the inner ring to develop a bell-form mouth on the ends of the pipe, and in which sealing means is carried by the outer face of the inner ring; said inner ring seating against the inner face of the outer ring.

6. Apparatus for producing a pipe of a desired diameter according to claim 1, in which the clamping means are guided to slide at the exterior of the reservoir; and in which the said clamping means includes an outer ring, and a wedge-shaped inner ring, the inner face of which is exposed to the pressure of said operating fluid.

7. Apparatus for producing a pipe of a desired diameter according to claim 1, in which the clamping means and sealing means includes a first clamping and sealing assembly adjacent said head frame, and a second clamping and sealing assembly adjacent the other end of said reservoir; with means for guiding said assemblies to shift longitudinally along the reservoir, power operated means with said first assembly for exerting force on said first assembly to force the pipe into the clamping and sealing means at the said other end, and a removable backstop ring operatively connected with said second assembly for resisting said force exerted upon said first assembly.

8. In apparatus for producing a pipe of a desired internal diameter, the combination of a frame structure, a head frame included in said frame structure, a reservoir for operating fluid supported on said head frame having a diameter approximating but smaller than the desired diameter to enable a pipe to be telescoped over said reservoir, first annular inner and outer dies mounted on said reservoir for closing one end of said pipe, second annular inner and outer dies mounted on said reservoir for closing the other end of said pipe said first and second inner and outer dies functioning to form bells at the ends of said pipe and to clamp and seal the ends of the pipe means for effecting entry of fluid to said pipe, and means for increasing the pressure of the fluid within the pipe to expand the same unrestrictedly to approximately the desired inside diameter; and in which the means for increasing the pressure in the pipe includes a pump delivering the operating fluid only into the fluid that fills the reservoir; there being passages in the reservoir wall communicating between the reservoir and the annular space between the reservoir and the wall of the pipe.

9. In apparatus for forming a bell at the end of a pipe, the combination of an upright head frame supported on the floor, a horizontal core mounted on and projecting from said head frame, a main upsetting assembly slidably mounted on said core, said main upsetting assembly including first die rings for upsetting and clamping the adjacent end of the pipe, power exerting means on said head frame for forcing the main upsetting assembly against the adjacent inner end of the pipe for upsetting the same, said first die rings being disposed to engage the inner and outer sides of the pipe and being capable of forming an incipient bell therein and clamping the adjacent end of the pipe; an auxiliary upsetting assembly slidably mounted on said core adjacent the outer end of said core, said auxiliary upsetting means including second die rings for upsetting the outer end of the pipe to form a real bell at that outer end, a base ring slidably mounted on said core on the outside of said auxiliary upsetting assembly, power means mounted on said core adjacent said base ring for exerting force on the base ring to move the auxiliary upsetting assembly into working contact with the adjacent end of the pipe, said second die rings being disposed to engage the inner and outer sides of the pipe to offset the material thereof into the form of a real bell at the outer end, and means for exerting pressure on the interior of the pipe to expand the body of the pipe to eliminate the incipient bell but to leave the real bell on the pipe.

10. Apparatus for treating pipe having a nominal uniform inner diameter which comprises means for supporting a pipe at its ends, said supporting means including a first upsetting assembly with inner and outer die rings at one end of the pipe functioning to upset a real bell on said one end of the pipe and including a second upsetting assembly with inner and outer die rings to upset an incipient bell on the other end of the pipe, said die rings functioning and operating to clamp the upset material of said pipe and plugging liquid tight the mouths of both of said bells, and means operating while the die rings are clamping the upset material to subject the interior of the pipe to sufficient pressure to expand the body portion of the pipe between said bells including the material adjacent to the real bell to an outer diameter sufficient to eliminate the incipient bell.

11. Apparatus for forming a bell at the end of a pipe having normally uniform diameter, according to claim 9, in which said base ring in one position abuts a split back-up ring capable of being opened up to pass over said core and of being closed to seat in a groove in said core.

12. Apparatus for forming a bell at the end of a pipe having normally uniform diameter, according to claim 9, in which there is a spider having a hub with a plurality of substantially radial arms for engaging the outer side of the auxiliary upsetting assembly, the ends of said arms being movable into engagement with the outer side of said base ring to move the same forward and thereby advance the base ring and the auxiliary upsetting assembly toward said inner end; and power means having a guide rod carrying said hub and mounted on the core for actuating said spider for moving the auxiliary upsetting assembly toward the main upsetting assembly.

13. Apparatus for forming a bell at the end of a pipe, according to claim 12, in which said core is a reservoir for operating liquid, said reservoir having a head at its outer end, and said power means is mounted on said head.

14. Apparatus of the kind described for forming a bell on the end of a pipe, according to claim 9, including means for ejecting the pipe end from the upsetting assembly after the pipe has been upset to develop a bell on the pipe end.

15. Apparatus of the kind described for forming a bell on the end of a pipe, according to claim 9, including a plurality of ejector rods in circumferentially spaced locations between the die rings of the auxiliary upsetting assembly with the rod ends projecting toward the pipe end, and in line with the pipe wall, and mechanism for effecting the advance of said ejector rods after the die rings have completed their operation upon the pipe ends, to separate the auxiliary upsetting assembly from the adjacent end of the pipe.

16. Apparatus for belling and truing pipe comprising a frame structure, a head frame vertically upstanding at one end of said frame structure, an under-frame extending horizontally from said one end of said frame structure, a pipe-supporting dolly, means for mounting said dolly on said under-frame, a core supported at one end only on said head frame and extending horizontally over said under-frame, said core being closed except at the top to serve as a liquid reservoir, a pair of upsetting assemblies surrounding said core and slidably mounted thereon, a stop on said core to limit sliding movement of one of said assemblies in one direction, means included in said assemblies for enlarging both ends of a pipe disposed on said dolly and encompassing said core and for engaging the inside and outside of both enlarged ends of said pipe, means supported on said head frame for urging said assemblies and a pipe engaged thereby in the direction of said stop, means included in said assemblies for effectuating a liquid seal between said assemblies and a pipe engaged thereby, and means for filling said core and said pipe with liquid under pressure while said assemblies are engaged with said pipe.

17. Apparatus for producing a pipe of a desired internal diameter according to claim 8 in which said reservoir for the operating fluid is supported at only one end and is located coaxially within the pipe and is maintained substantially full of the operating fluid, and in which the interior of said reservoir communicates at a high level only through said passages with the annular space around the reservoir and within the pipe.

References Cited in the file of this patent

UNITED STATES PATENTS

| 249,132 | White | Nov. 1, 1881 |
|---|---|---|
| 1,216,733 | Rowland | Feb. 20, 1917 |
| 1,647,121 | Beall | Nov. 1, 1927 |
| 1,853,411 | Gentry | Apr. 12, 1932 |
| 1,971,251 | Cornell | Aug. 21, 1934 |
| 2,375,763 | Blais | May 15, 1945 |
| 2,396,380 | Longley | Mar. 12, 1946 |
| 2,427,685 | Midtlyng | Sept. 23, 1947 |
| 2,445,876 | Fullerton | July 27, 1948 |
| 2,460,580 | Huber | Feb. 1, 1949 |
| 2,479,847 | Longley | Aug. 23, 1949 |
| 2,493,127 | Franck | Jan. 3, 1950 |
| 2,623,570 | Resser | Dec. 30, 1952 |
| 2,667,136 | Reichl | Jan. 26, 1954 |
| 2,671,338 | Reichl | Mar. 9, 1954 |
| 2,671,339 | Krause | Mar. 9, 1954 |
| 2,755,661 | Lorant | July 24, 1956 |
| 2,780,093 | Ewart | Feb. 5, 1957 |

FOREIGN PATENTS

| 582,238 | Germany | Oct. 5, 1933 |
|---|---|---|

OTHER REFERENCES

Pages 111–115 of December 1950 issue of Iron & Steel Engineer, a publication found in the Patent Office Library—code TS—300–165, while a reprint may be found in Div. 93.